United States Patent [19]
Otsuka

[11] Patent Number: 5,442,914
[45] Date of Patent: Aug. 22, 1995

[54] SHAPE MEMORY ALLOY HEAT ENGINE

[76] Inventor: George K. Otsuka, 15545 N. Brentwood, Channelview, Tex. 77530

[21] Appl. No.: 162,297
[22] Filed: Dec. 7, 1993
[51] Int. Cl.⁶ .............................................. F03G 7/00
[52] U.S. Cl. .......................................... 60/527; 60/516
[58] Field of Search ........................ 60/527, 528, 516

[56] References Cited

U.S. PATENT DOCUMENTS

| | | | |
|---|---|---|---|
| 4,086,769 | 5/1978 | Smith | 60/527 |
| 4,836,496 | 6/1989 | Abujudom et al. | 60/528 |
| 5,107,235 | 4/1992 | Torres-Isea | 335/35 |
| 5,279,123 | 1/1994 | Wechsler et al. | 60/527 |

*Primary Examiner*—Ira S. Lazarus
*Assistant Examiner*—L. Heyman
*Attorney, Agent, or Firm*—Michael P. Breston

[57] ABSTRACT

The SMA-CDS engine uses shape-memory-alloy (SMA) means which include at least one stack of conical-disc-springs (CDSs) mounted on a perforated tube. Each CDS has a zero axis, a martensite mode, and an austenite mode. A support structure mounts the CDSs on a tube so as to allow each CDS to reciprocate along the tube's outer wall and to deflect within a predetermined deflection range. A drive shaft is attached through a coupler to the stack of CDSS. Heating and cooling means cyclically heat and cool the stack of CDSs thereby causing each CDS thereof to cyclically transform in response to the heating from its said martensite mode into its said austenite mode, and in response to the cooling to return to its said martensite mode, and during each such transformation cycle each CDS deflects within the predetermined deflection range and generates martensite deflection forces and austenite extension forces of different magnitudes which result in a resultant force that causes the drive shaft to reciprocate.

18 Claims, 8 Drawing Sheets

5,442,914

SHAPE MEMORY ALLOY HEAT ENGINE

BACKGROUND OF THE INVENTION

This invention relates to a SMA heat engine, in general, and to a SMA-CDS heat engine in particular. SMA heat engines have been proposed using various shapes of SMA units. SMA actuators have been also proposed using various shapes of SMA materials including "conical-disc-springs" (CDS). One such actuator is described in U.S. Pat. No. 4,836,496.

SUMMARY OF THE INVENTION

The SMA-CDS engine uses shape-memory-alloy (SMA) means which include at least one primary stack of conical-disc-springs (CDS) mounted in a main housing. The discs are stacked in series relationship, and inside and outside spacers separate each pair of consecutive discs so as to enable each disc to deflect beyond its zero axis. To increase the resultant force, each disc can be coupled in parallel with another identical disc. A heat conductive washer is sandwiched between each pair of discs to permit a quick and uniform heat transfer between the surfaces of the discs. A tube which has openings in its wall is mounted in the housing. Holes that are in the inside spacers are in alignment with the tube's openings. The discs and the inside and outside spacers therebetween together reciprocate along the outer wall of the perforated tube.

Preferably, the SMA means also include a secondary stack of CDS discs mounted in a second housing. The discs in the secondary stack are made of a different metal alloy than the discs in the primary stack and they provide the needed bias force.

A first drive shaft is operatively coupled to the primary disc stack. A second drive shaft in the second housing is operatively coupled to the secondary disc stack. The second drive shaft reciprocates in opposite phase with the first reciprocating drive shaft.

A rotatable member is rotated by the drive shaft at an angular speed that is a function of the duration of the deflection cycle. The primary and secondary disc stacks are mounted so that their reciprocating motions oppose each other and the rotatable member is driven by both disc stacks.

A source of energy cyclically heats and cools the primary disc stack to cause each disc to cyclically deflect within a predetermined deflection range so that each disc transforms, during each deflection cycle, from its martensite mode into its austenite mode in response to the heating, and then returns to its martensite mode in response to the cooling. Each disc during each heating and cooling cycle generates martensite and austenite deflection forces of different magnitudes that impart a substantially constant resultant force on the drive shaft, whereby the primary stack reciprocates at a linear stroke which is a function of the product $D \times N$, where D is the deflection of a single disc and N is the number of discs in the primary stack.

The heating and cooling means include hot and cold pumps for cyclically pumping inside the tube pressurized hot and cold fluids that flow out through the tube's openings for spraying the exposed surfaces of the discs.

The hot and cold pumps are driven by the rotating member and are timed to pump the hot and cold fluids into the disc stacks without interrupting the reciprocating motions thereof.

In one embodiment, the primary disc stacks have an austenite transformation temperature range from about 0° C. to −65° C.

In another embodiment, the primary disc stacks have an austenite transformation temperature range from about 100° C. to 260° C., and the energy means include gases which transfer heat to and from the disc stacks.

DETAILED DESCRIPTION OF PREFERRED EMBODIMENTS

Figure 1:
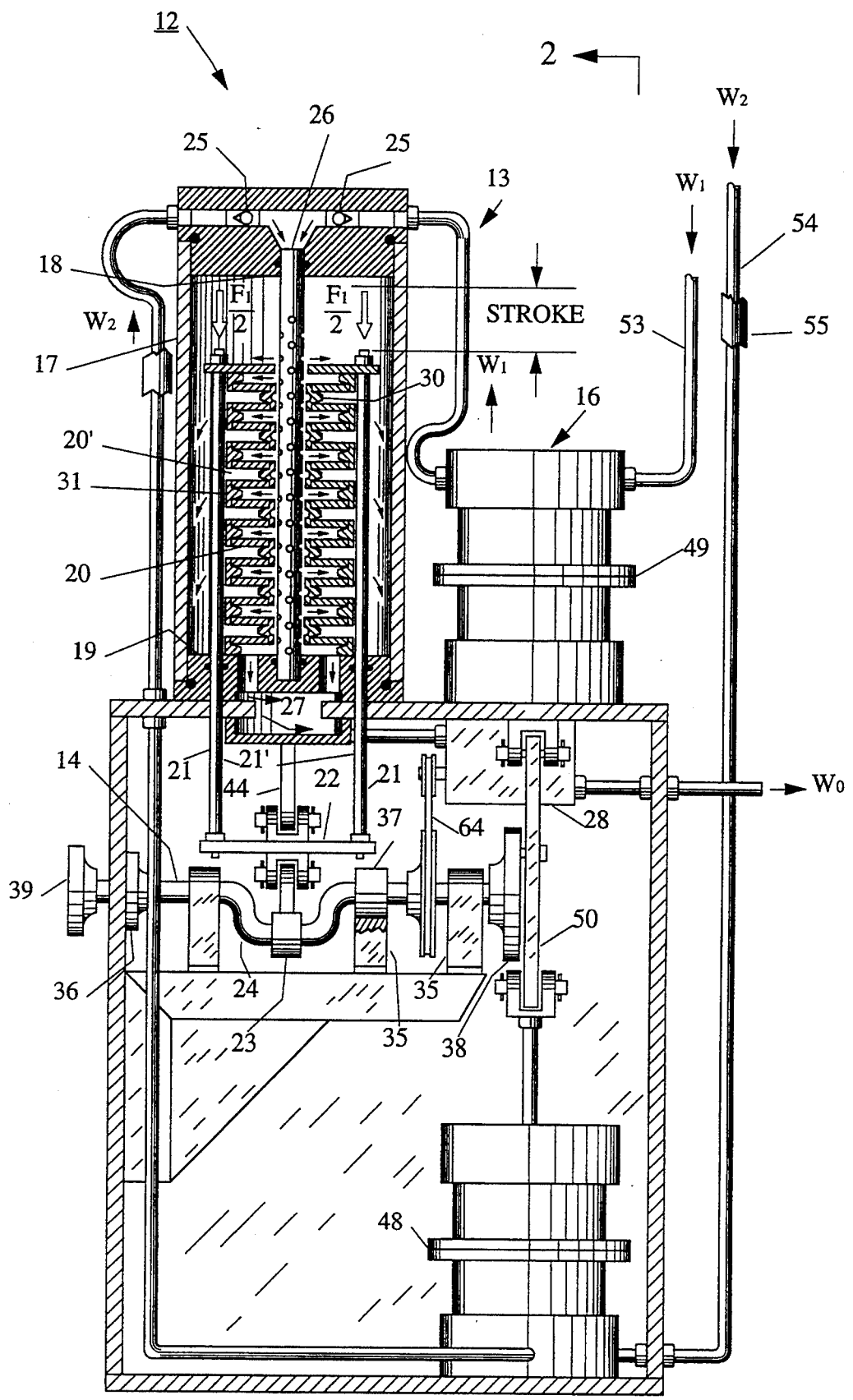
FIG. 1 is a perspective view, partly in section, of the novel SMA-CDS engine operating at ambient temperature, wherein the fluid medium is liquid and the CDS discs are connected in series.
Figure 2:
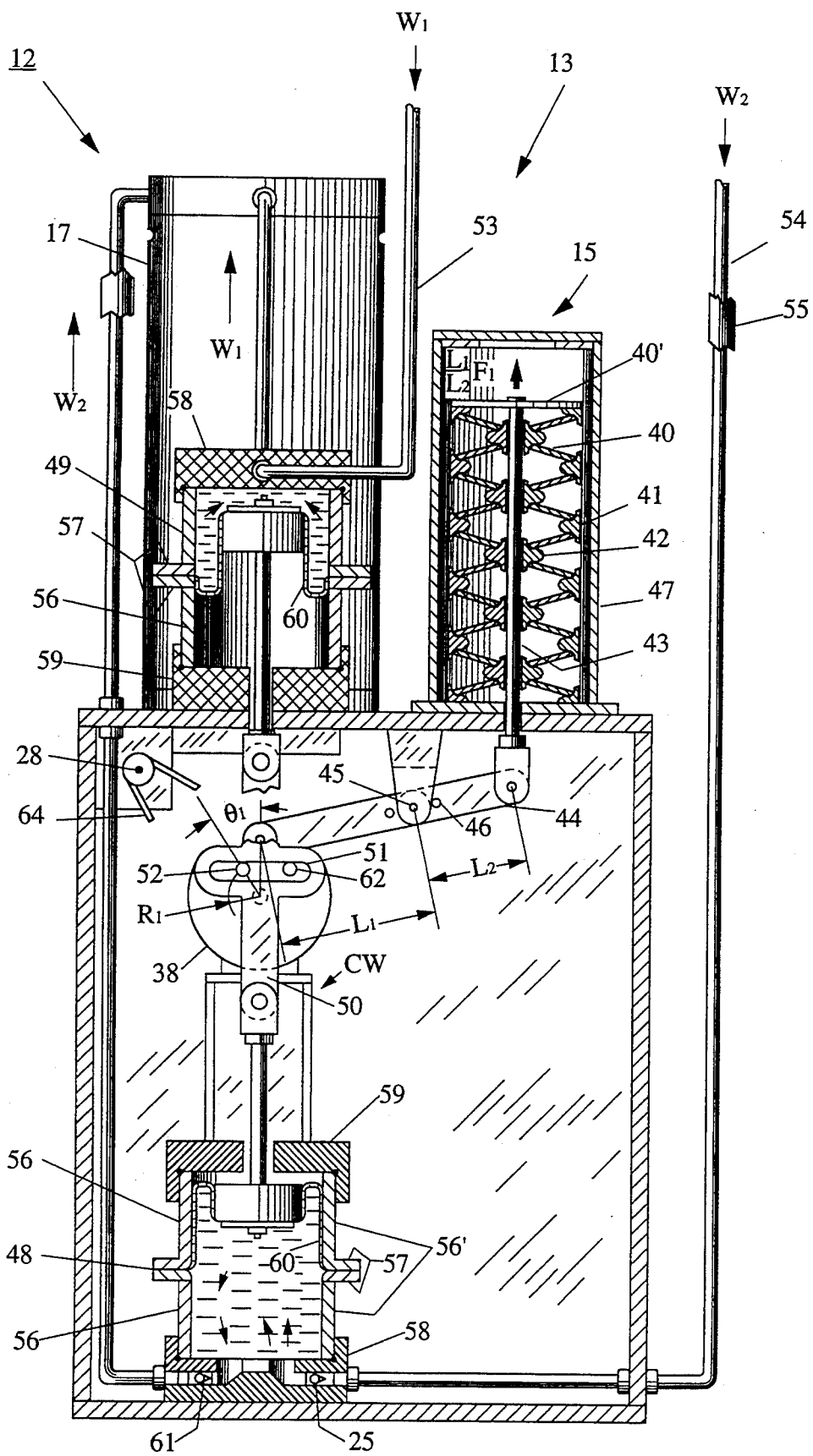
FIG. 2 is a longitudinal, partly sectional view taken on line 2—2 of FIG. 1.

FIGS. 1 and 2 show a first embodiment 12 of the novel SMA-CDS engine 13 of this invention. Engine 13 is designed to operate at moderate temperatures, wherein the circulating fluid medium is liquid such as water, and requires an energy source 16 which alternately supplies hot and cold liquid media during each SMA deflection cycle. Engine 13 uses a primary stack 20' of conical-disc-springs (CDS) 20 mounted in a main housing 17. At least two push rods 21' form a drive shaft 21 in the main housing which is operatively coupled to the discs 20.

Each disc 20 cyclically deflects within a predetermined deflection range so that each disc transforms, during each deflection cycle, from its martensite mode into its austenite mode, in response to the heating, and then returns to its martensite mode in response to the cooling.

Engine 13 also includes a rotatable member, such as a crankshaft 14 coupled to drive shaft 21, which rotates at an angular speed that is a function of the duration of the discs' deflection cycle. FIG. 3a shows a single SMA-CDS disc, which is typically made of an alloy of nickel and titanium (NiTinol). In a CDS disc the ratio h/t, where h is the height of the cone and t is the thickness of the spring, controls the magnitude of the generated output force F and its deflection range (FIGS. 3a, 7).

This h/t ratio is limited to a value in a range from about 1.45 to 2.0. Within this range, the generated force F approximates a constant over a range of deflections. If h/t is larger than 2.0, greater peak forces will be generated by the disc which will be accompanied by greater stresses. Also, the variation between $F_{max}$ and $F_{min}$ will become larger and nullify its effectiveness as a constant force. A h/t ratio of less than 1.45 will result in decreasing deflections as the ratio becomes smaller (see The Uniform-Section Disc Spring by J. O. Almen and Laszlo published by GM Research pgs. 305–314, ASME Transactions 1935.)

Figure 7:
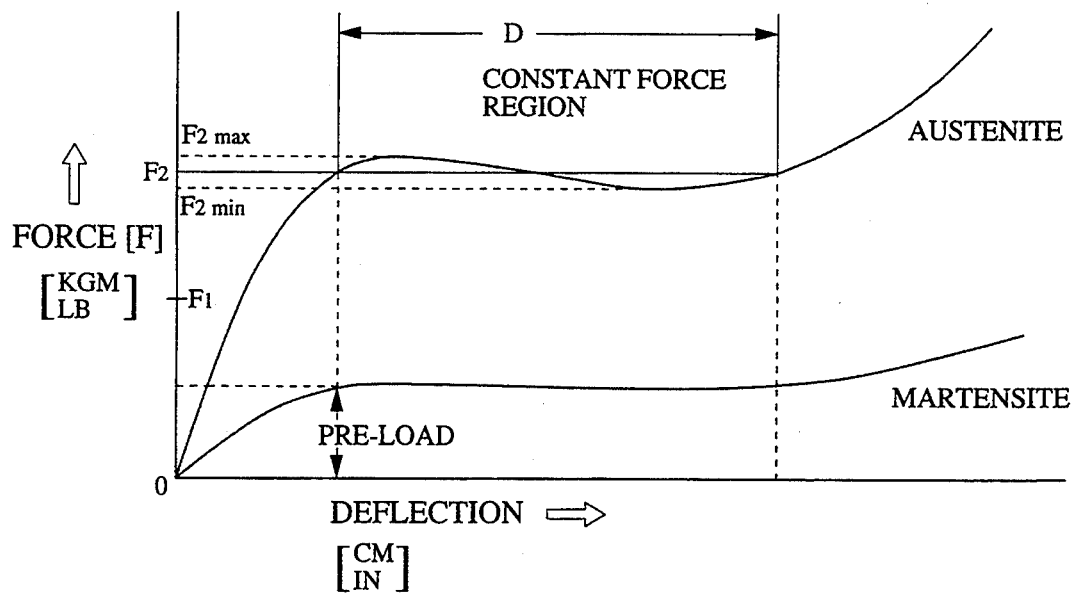
FIG. 7 shows force-deflection curves for a single SMA-CDS disc which are indicative of the relationships between the austenite and martensite forces.

FIG. 7 shows martensite and austenite force deflection curves for a single SMA-CDS disc. Deflection D represents the approximate constant force region.

There is a preload force applied to the primary disc stack in order to keep it tight and make it ready to respond to temperature changes. The magnitude of the preload force is about equal to the maximum martensite force.

Because each CDS disc is compact, a stack of them can be assembled within a small volume. Also, since each disc has large exposed surfaces but a thin cross-sectional area, a quick heat transfer response can be achieved.

Engine 13 uses a constant reciprocating force to drive a crankshaft 14, a bias force means 15, and water heating and cooling means 16 as the heat transfer liquid but other liquids can be used as well.

To produce power, engine 13 utilizes temperature differentials between liquids $W_1$ and $W_2$ (FIGS. 1, 9), such as cold and hot water, or between cold and hot gases $G_1$ and $G_2$ such as steam. Hot water can be obtained from industrial waste heat or from natural heat sources, solar or geothermal.

Liquid $W_2$ or gas $G_2$ must be hot enough to compensate for heat losses and yet still be at the austenite transformation temperature when the medium is exhausting. In the lower temperature range, liquid $W_1$ or gas $G_1$ must be below the martensite transformation temperature to compensate for heat gain and still be near the martensite transformation temperature when exhausting.

When a SMA-CDS engine, in the martensite mode, is exposed to a heated fluid, such as hot water, it transforms into its austenite mode. Then it returns to its martensite mode when it is exposed to cooling water. Due to the difference in the magnitudes of the martensite and austenite forces, a useful net constant resultant force is produced.

In the SMA-CDS heat engine, the SMA-CDS primary stacks are used to provide the forces needed to drive the engine. During each heating and cooling cycle, each disc generates martensite and austenite deflection forces of different magnitudes that impart a substantially constant resultant force on the drive shaft 21 to cause the stack of discs 20' to reciprocate at a linear stroke which is a function of the product D×N, where D is the deflection of a single disc and N is the number of discs in the stack. The engine's torque is the product of the force F times its linear stroke.

Whenever necessary to keep heat dissipation to a minimum, plastics are preferred. Whenever necessary to achieve high heat conductivity, copper or aluminum materials are used.

The main housing 17 of engine 13 is made from a clear plastic pipe, sealed at both ends with plastic manifolds 18 and 19. By combining two or more CDS discs in series the output force F remains the same but the engine stroke is increased. Housing 17 includes a number of identical SMA-CDS 20 discs assembled in series to form a primary stack 20', which reciprocates back and forth.

Drive shaft 21 that follows the reciprocating motion is secured to a drive plate-clevis 22 which also provides a pivot for one side of connecting rod 23 whose other side pivots at the crank 24 of crankshaft 14. This embodiment allows for the reciprocating motion to become converted into rotary motion.

Within the top manifold 18 are two inlet check valves 25 that control incoming hot and cold liquids. Valves 25 direct liquid flow into perforated tube 26. Bottom manifold 19 contains a reservoir 27 in which exhaust liquid is collected. Exhaust pump 28 drains out reservoir 27.

Figure 3:
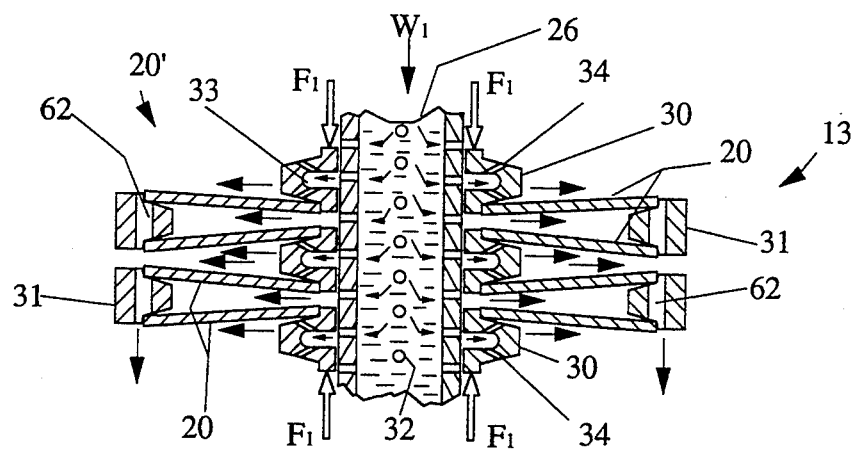
FIG. 3 is an enlarged, fractional sectional view of the engine in its martensite mode, and showing spacers between the discs mounted on a perforated tube.
Figure 4:
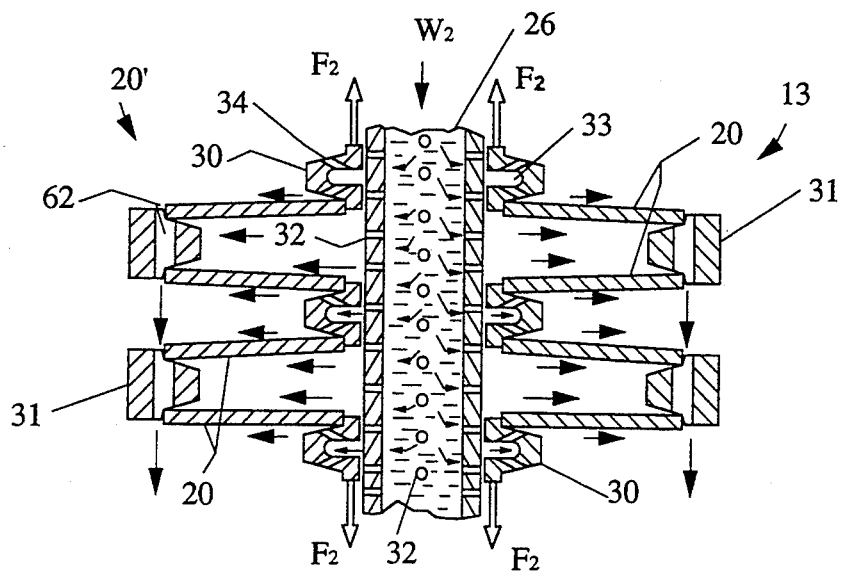
FIG. 4 is similar to FIG. 3 but showing the engine in its austenite mode.
Figure 3A:
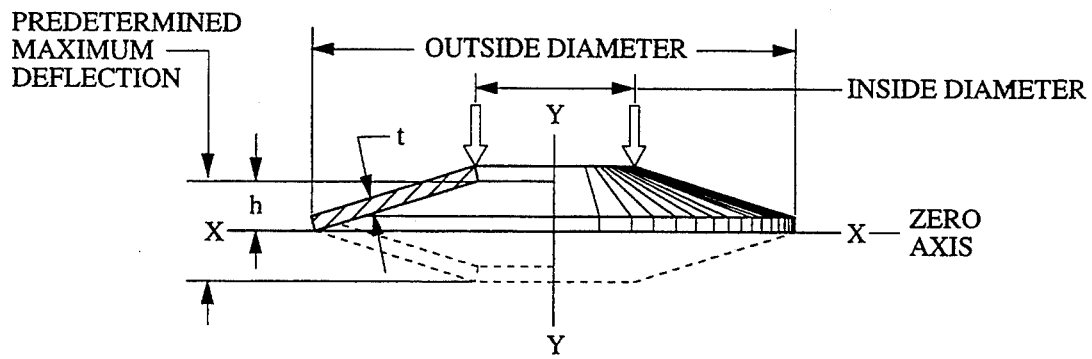
FIG. 3a is a perspective view, partly in section, of a single CDS disc showing dimensions in X-Y coordinates.

FIG. 3 shows the engine 13, when in its martensite mode, using spacers 30,31 between the discs 20 which are mounted on a perforated tube 26. It is mounted at the center of housing 17 and secured to both manifolds 18,19. FIG. 4 shows engine 13 in its austenite mode.

Perforated tube 26, preferably made of copper, permits the reciprocating motion of the primary SMA-CDS stack 20'. Tube 26 has radial holes 32 which feed pressurized liquid into the inside diameter of disc stack 20' as shown by the arrows. The liquid is sprayed radially outwards from tube 26 and in a circular pattern.

The SMA-CDS discs 20 are separated from each other by the spacers 30,31 at the inside and outside diameters of discs 20 (FIGS. 1, 3 and 4). All spacers 30, 31 are made from aluminum and all excess metal is removed to minimize unnecessary heat conduction. Spacers 30,31 permit each disc 20 to deflect beyond the zero horizontal axis (FIG. 3a) to permit maximum deflection.

Spacers 30 have precision machined inside diameters to match the outside diameter of perforated tube 26, thereby to minimize water losses from metal clearances. Spacers 30 have cavities 33 and holes 34 to allow the sprayed liquid to cover as much as possible of the discs' surfaces (FIG. 3). Crankshaft 14 has a single crank 24 and is made from a stainless steel rod. Three spaced-apart vertical bearings 35 and a wall-mounted, sealed ball bearing assembly 36 support crankshaft 14. The bearing supports 35 are fitted with oil-impregnated bronze bushings 37. Two flywheels 38, 39 are mounted at the opposite ends of crankshaft 14. Flywheel 38 drives the heating and cooling means 16, while flywheel 39 provides the output power from crankshaft 14.

Using an external bias force that is sufficient to deform the martensite SMA, a reciprocating motion can be established for as long as the water supply alternates between hot and cold.

The opposing bias force means 15 is required to deflect a primary disc stack 20' at its martensite mode. An opposing bias force $F_1$ (FIGS. 2, 3) is generated by a secondary reciprocating stack 40' made up of beryllium copper (Be—Cu) CDS discs 40. Each Be—Cu CDS disc 40 is supported with outside and inside spacers 41 and 42 all assembled in series on drive rod 43. Disc stack 40' is housed in a metal pipe housing 47. Drive rod 43 reciprocates in opposite phase with push rods 21. Bias force means 15 operates within a constant force region.

Each disc 40 has about the same size and shape as SMA-CDS disc 20, but each disc 40 generates a larger force than that produced by a disc 20. This larger force is reduced to proper amplitude with a lever 44, which is divided into two adjustable lengths $L_1$ and $L_2$. At the junction of $L_1$ and $L_2$ is a pivot 45 insertable within one of three bores 46 to permit adjusting the bias force $F_1$.

Figure 8:
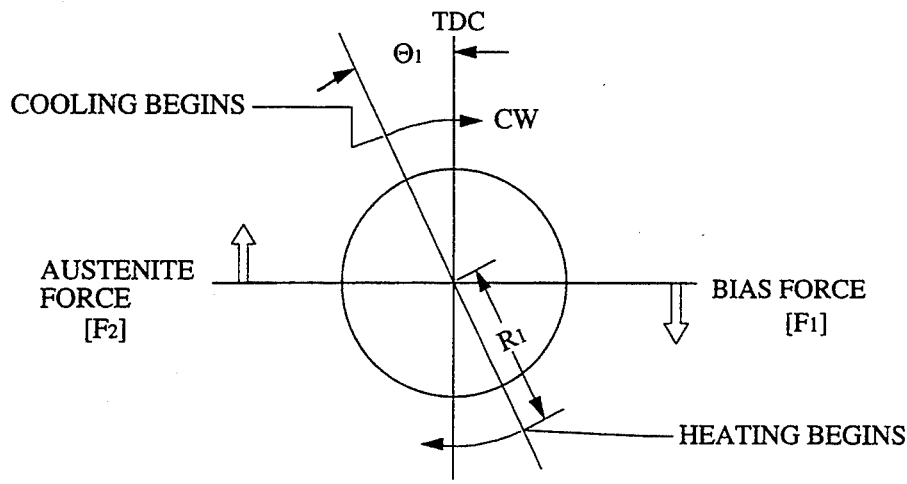
FIG. 8 shows the angular relationship between the austenite force $F_2$ and the bias force $F_1$ during a single cycle of engine rotation.

FIG. 7 shows force-deflection curves for a SMA-CDS disc, and FIG. 8 shows the angular relationship between austenite force $F_2$ and bias force $F_1$ during a single cycle of engine rotation. The two forces $F_1, F_2$ are about equal in magnitude but there is a 180° phase difference therebetween.

Heating and cooling is controlled by pumps 48, 49 which are linked to operate as the single heating and cooling means 16 (FIGS. 1, 2). Yoke 50 and pumps 48, 49 are secured together with flywheel 38. Yoke 50 has a slotted lateral hole 51 at flywheel 38 and a shoulder screw 52, so that yoke 50 can travel up and down as flywheel 38 rotates.

Cold liquid $W_1$ is supplied by tube 53. Hot liquid $W_2$ is supplied by tube 54 having insulation 55.

Each housing 56' of pumps 48, 49 consists of two metal cylindrical sections 56 having a flanged connection 57. Each housing is sealed by plastic manifolds 58 and 59. Flange 57 secures a diaphragm 60 to provide a leakproof connection. Installed on the pressure side of manifold 58 are two check valves 25 and 61 that control and direct liquid flow.

Design and operation of the hot liquid pump 48 and cold liquid pump 49 are identical. These single-acting pumps 48,49 have a rolling diaphragm piston to reduce friction and fluid leakages. They are more efficient at lower rpm and permit a measured volume of fluid to be delivered to disc stack 20' during each stroke.

Inlet check valves 25 are set at a low cracking pressure to control water flow into the pumps 48, 49. Outlet check valves 61 are set at a higher cracking pressure so that liquid pressure reaches a certain level before it opens and directs water flow into housing manifold 18 (FIG. 1). Since pumps 48,49 are single acting, when one pump is in its output stage, the other pump is in its inlet stage.

Timing of pump operations is controlled by advancing or retarding the shoulder screw 52 within holes 62 relative to top-dead-center (TDC) of engine cycle (FIG. 8).

The angle between TDC and the center of shoulder screw 52 is denoted as $O_1$. The radius arm $R_1$ from center of flywheel 38 to the center of shoulder screw 52 determines the stroke or displacement of both pumps 48, 49.

Angle $O_1$ is shown in an advanced position in FIGS. 2, 8 to permit the pumps to supply hot or cold liquids at the correct time to produce a smooth engine rotation.

Pressurized liquid $W_1$ or liquid $W_2$ from pumps 48 and 49 enters top manifold 18 and flows through inlet check valve 25 into perforated tube 26.

When cavities 33 within inside spacers 30 (FIGS. 3-4) align with holes 32, a stream of liquid will spray out over the outside surfaces of SMA-CDS discs 20 through equally spaced holes 34 in spacers 30.

As primary disc stack 20' reciprocates over a series of holes 32, the surfaces of SMA-CDS discs 20 become exposed to liquid sprays that cover a circular pattern.

Exhaust liquid $W_0$ will flow by gravity down from disc stack 20' to a reservoir 27 within bottom manifold 19. Drain holes 62 in both spacers 30 and 31 facilitate quick drainages. A gear pump 28 (FIGS. 1,2) is used as the exhaust pump which is driven from crankshaft 14 with a V-belt drive 64 (FIG. 2).

Figure 5:
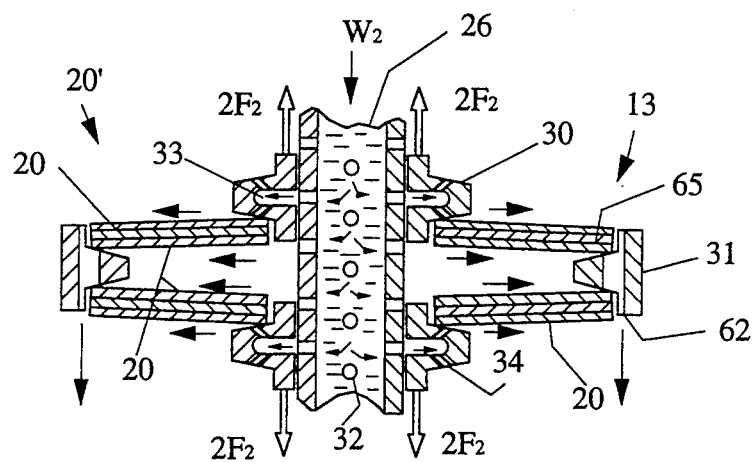
FIG. 5 is an enlarged, fractional sectional view of an engine similar to FIG. 1 but using pairs of discs coupled back to back.

FIG. 5 shows an engine similar to engine 13 but using pairs of discs 20 coupled back-to-back. Combining two discs back-to-back in parallel doubles the output force F. A copper wire mesh washer 65, sandwiched between two discs 20, permits a quick and uniform heat transfer between the discs' surfaces.

Figure 6:
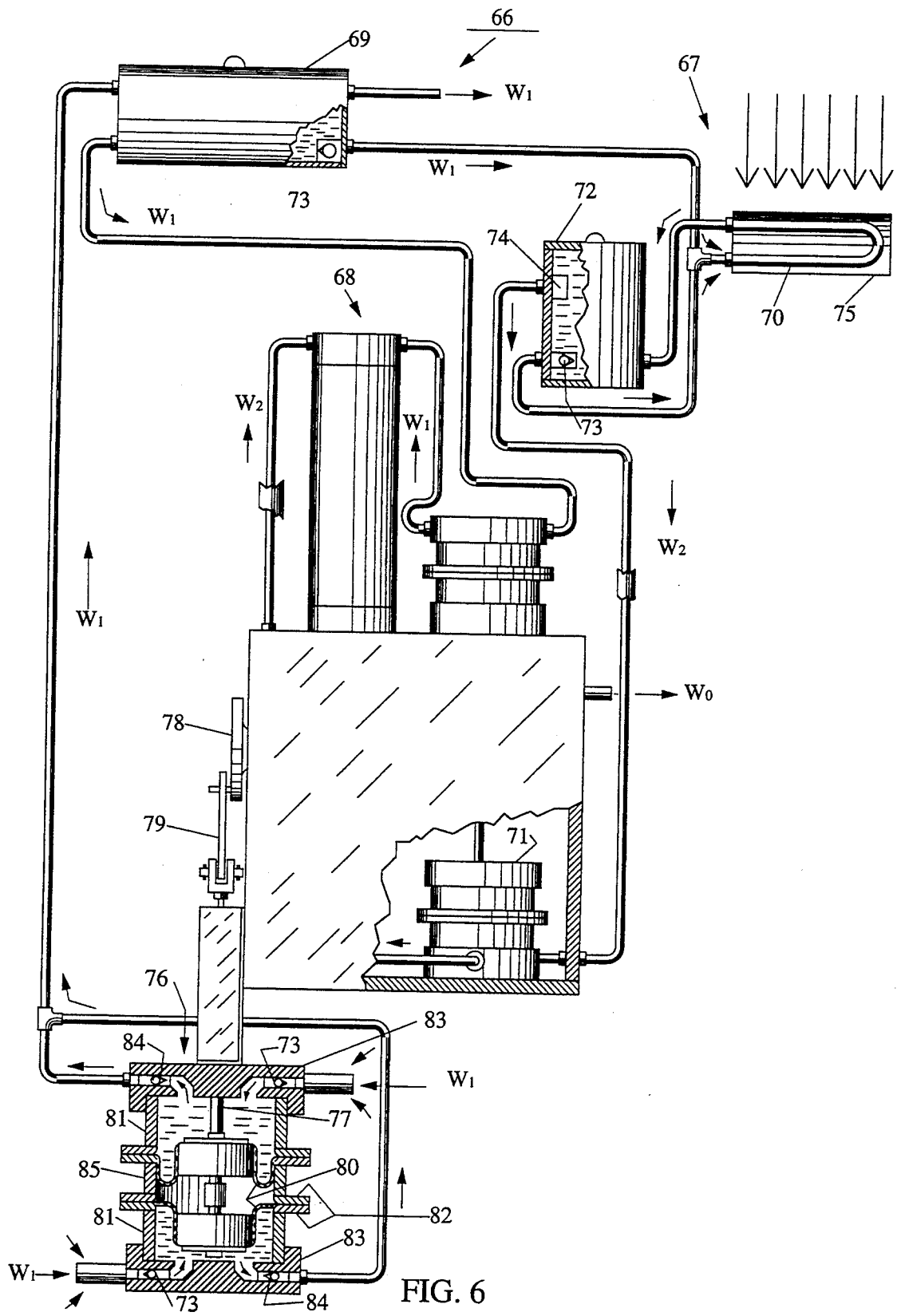
FIG. 6 is a perspective view, partly in section, of an engine as in FIG. 1 in which the fluid medium is solar heated.

FIG. 6 shows a second embodiment 66 which uses hot water $W_2$ from a solar heated energy system 67 to drive a SMA-CDS engine 68. Cold water $W_1$ is at ambient temperature. The height of the main reservoir 69 provides the necessary static head to circulate cold liquid $W_1$ into solar heater 70 and into hot water pump 71. Hot water reservoir 72 has a check valve 73 and a thermostatic valve 74 which opens at a predetermined temperature. Cold water $W_1$ from main reservoir 69 flows into solar heater 70 located at the line of focus on a parabolic reflector 75. The outer surfaces of solar heater 70 are especially processed to facilitate maximum heat absorption.

Due to liquid thermal action, warm water rises to the top and enters hot water reservoir 72. Further thermal-siphon flow within hot water reservoir 72 forces cooler water out into solar heater 70 for additional heating. Outlet check valves 73 in both reservoirs 69,72 keep water flowing in one direction. Lukewarm water continues to cycle between reservoirs 72 and 70 until it becomes hot enough to open thermostatic valve 70 and flow into hot water pump 71.

A double-acting diaphragm pump 76 (FIG. 6) supplies water to main reservoir 69. Pump rod 77 is driven from output flywheel 78 through connecting rod 79. Pump 76 incorporates two axially-opposed diaphragms 80 so that there is a flow of water during each stroke. The two metal cylindrical halves 81 of pump 76 are identical. Each half 81 has a flange 82 and a plastic manifold 83. Manifolds 83 are fitted with an inlet check valve 73 and an outlet check valve 84. The center of diaphragms 80 is secured to pump rod 77 and their edges are clamped between flanges 82 of center section 85.

Embodiment 66 will operate anywhere sufficient solar energy is available. It can provide a water supply for household and/or irrigation uses.

Figure 9:
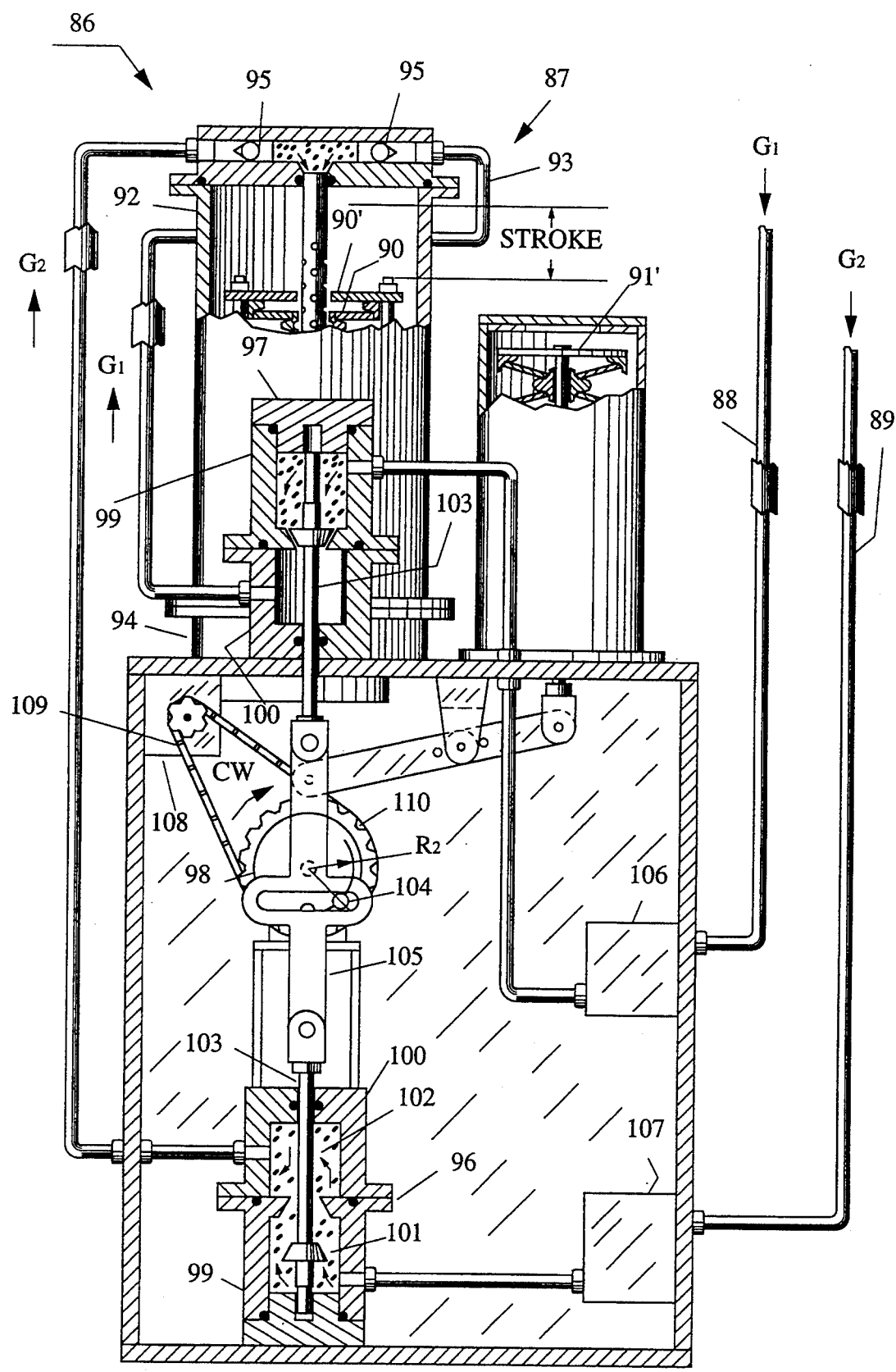
FIG. 9 is a perspective view, partly in section, of an engine as in FIG. 1 but in which the fluid medium is gas, and the engine and the discs are high-temperature rated.

FIG. 9 shows a third embodiment 86 featuring a high temperature SMA-CDS engine 87. It requires gases $G_1$, $G_2$ from insulated supply lines 88,89 for heat transfer such as steam or nitrogen. Steam is preferred because of its superior heat conductivity characteristics. Gas $G_1$ is the lower temperature steam supply and gas $G_2$ is the higher temperature supply.

High temperature SMA-CDS primary stack 90' comprised of CDS discs 90, and secondary disc stack 91' are substantially identical to their respective equivalents of disc 40 and secondary reciprocating disc stack 40' in embodiment 12.

Primary disc stack 90' has a range of austenite transformation temperatures from about 100° C. to over 260° C.

Metals are used for housing 92 instead of plastics to resist higher temperatures and pressures. Housing 92 is made of stainless steel pipe and houses stainless steel manifolds 93 and 94. Manifold 93 is fitted with inlet check valves 95.

The pumps used in embodiments 12 and 66 are replaced with identical valves 96,97 that are linked together and driven from a flywheel 98. Each valve has a flanged metal section 99 or 100 with an internal chamber 101 or 102. Valve plunger 103 controls the steam supply. A shoulder screw 104 secures yoke 105 to flywheel 98. The radius arm $R_2$ will determine the duration that a valve 96 or 97 remains open or closed.

Pressure regulators 106 and 107 correct for steam supply variations. Exhaust pump 108 is driven by a chain 109 and a sprocket 110. Output forces $F_2$ from high temperature operations will increase because as the SMA austenite transformation temperature increases, generated forces $F_2$ become larger.

Figure 10:
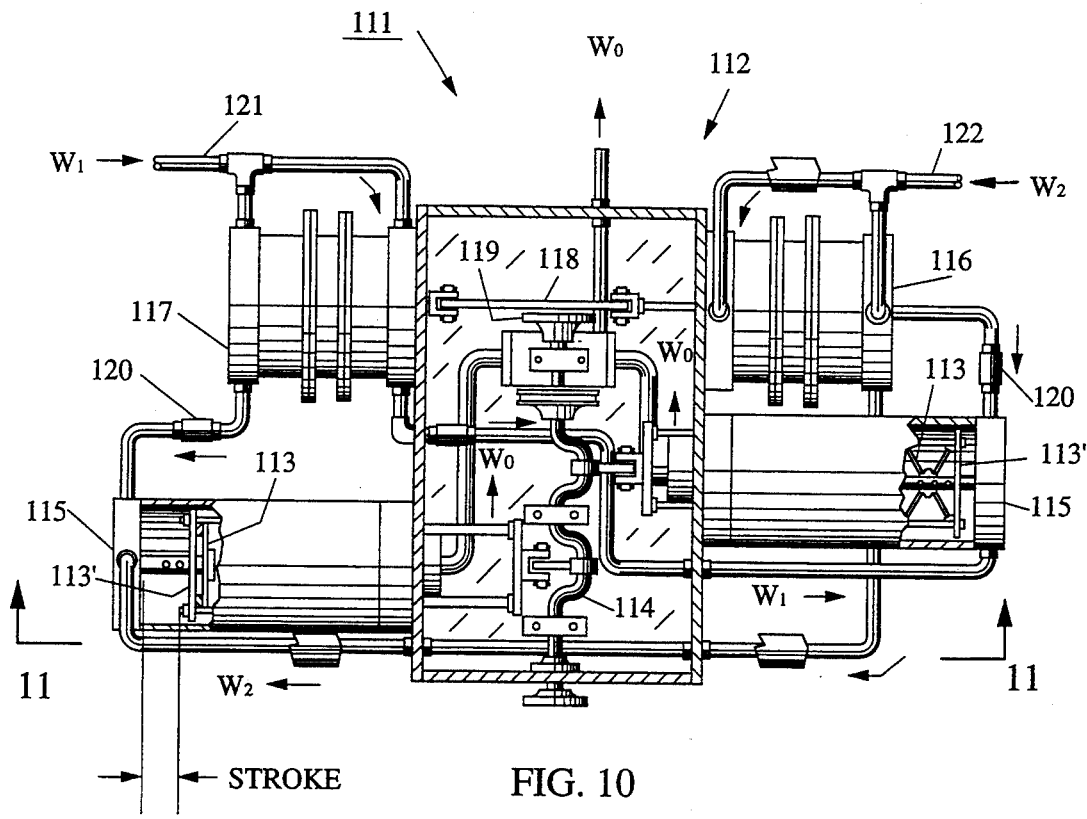
FIG. 10 is a perspective view, partly in section, of an engine having two primary disc stacks that drive one crankshaft. The two primary disc stacks are mounted so that their reciprocating motions oppose each other.
Figure 11:
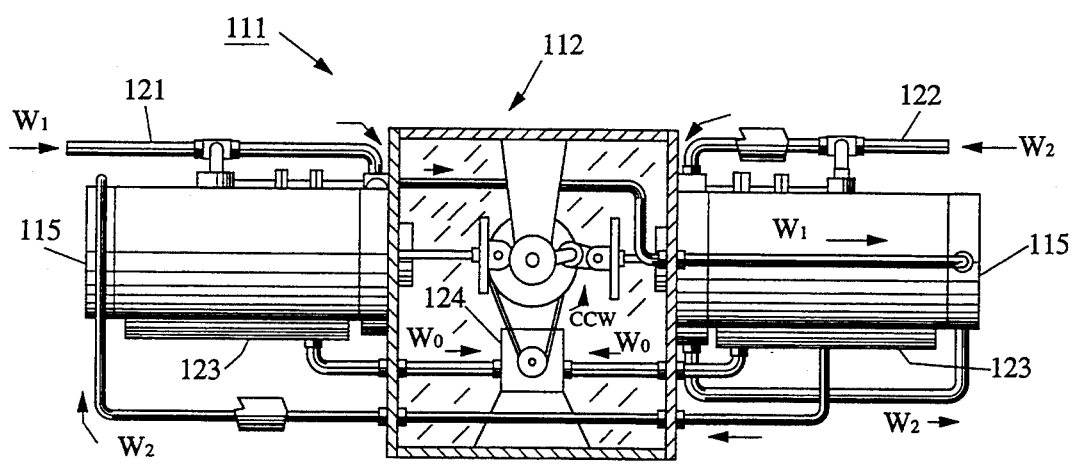
FIG. 11 is a sectional view on line 11—11 of FIG. 10.

FIGS. 10, 11 show a fourth embodiment 111 featuring a SMA-CDS engine assembly 112 having two primary disc stacks 113' that drive one crankshaft 114. The two disc stacks 113' are housed in a housing 115 and are mounted so that their reciprocating motions oppose each other. In this configuration, the need for a bias force means is eliminated because when one disc stack becomes austentic, the other disc stack becomes martensitic.

Heating and cooling pumps 116,117 are double-acting so that their heating and cooling fluids are delivered at the same time but to different primary disc stacks.

Pumps 116–117 are linked together by yoke 118 and flywheel 119 to be driven as a single unit. Adjustable pressure reducers 120 are used to balance pressure lines 121 and 122. A drain manifold 123 (FIG. 11) is located at the lowest point of housing 115. Exhaust fluids $W_0$ are collected in manifold 123 and flow into an exhaust pump 124.

Output power from embodiment 111 will be substantially increased because an opposing bias force is not required. Other embodiments can be incorporated into a an engine assembly 112 to broaden its field of application.

Figure 9A:
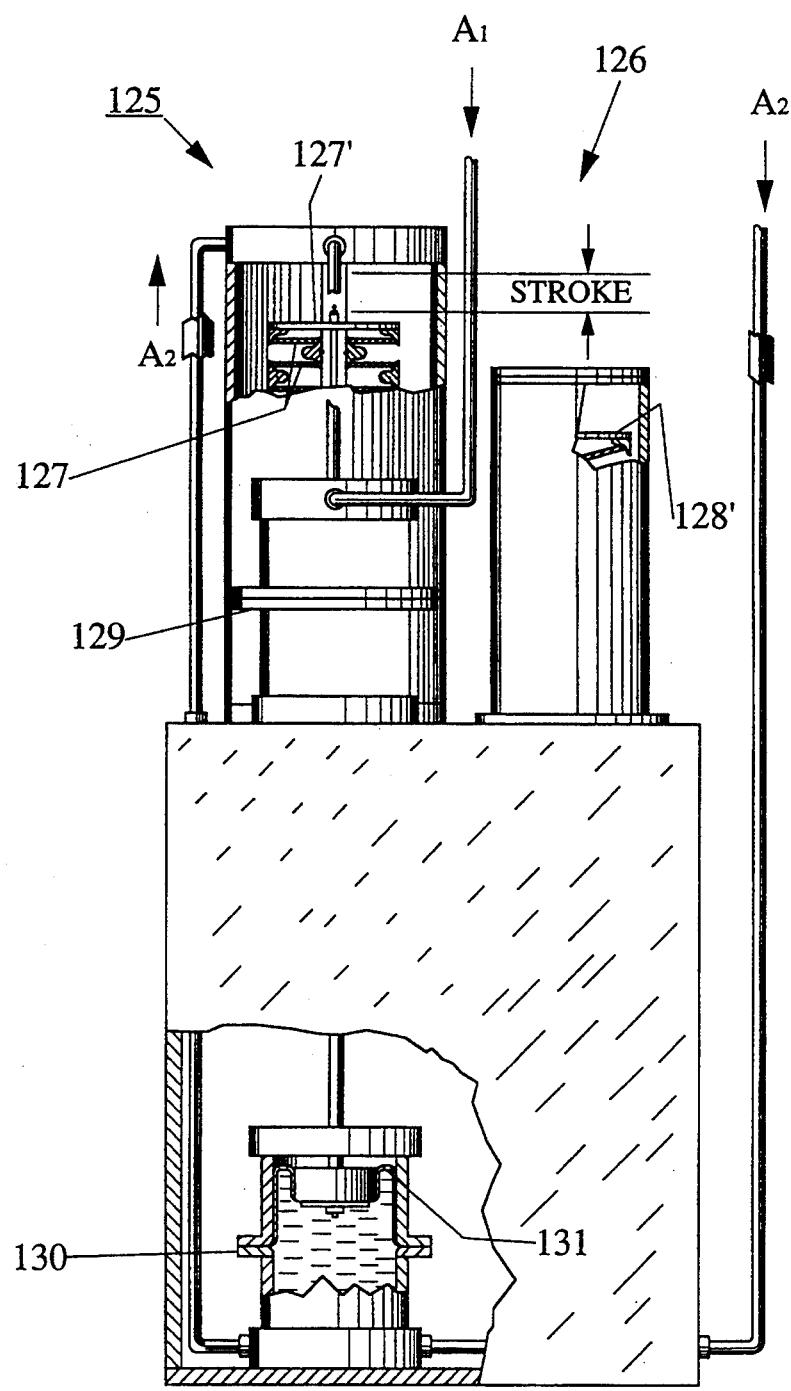
FIG. 9a is a perspective view, partly in section, of an engine as in FIG. 1 but in which the fluid medium is liquid and the engine and the discs are low-temperature rated.

The fifth embodiment 125 (FIG. 9a) is a low temperature SMA-CDS engine 126 which includes a primary SMA-CDS disc stack 127', comprised of CDS discs 127, which has a range of austenite transformation temperatures from about 0° C. to about −65° C. The bias secondary disc stack 128' is substantially identical to its equivalent bias force means 15 in the first embodiment 12. Pumps 129 and 130 are used to control heat transfer liquids $A_1$ and $A_2$ which are used in a sub-zero temperature environment. Diaphragm 131 is compatible with liquids $A_1$ and $A_2$.

What is claimed is:

1. A SMA-CDS engine, comprising:
   shape-memory-alloy (SMA) means including a first stack of primary conical-disc-springs (CDSs), each primary CDS having a zero axis, a martensite mode, and an austenite mode;
   a first housing;
   a first tube mounted in said housing;
   first mounting means for supporting said first stack of primary CDSs on said first tube so as to allow each primary CDS to reciprocate along an outer wall of said first tube and to deflect within a first predetermined deflection range;
   a first drive shaft;
   first coupling means for coupling said first drive shaft to said first stack of primary CDSs;
   a first heating and cooling means for cyclically heating and cooling said first stack of primary CDSs, thereby causing each primary CDS to undergo a corresponding transformation cycle during each heating and cooling cycle, so that in response to said heating each primary CDS transforms from its said martensite mode into its said austenite mode, and in response to said cooling each primary CDS returns to its said martensite mode; and
   during each transformation cycle, each primary CDS deflects within said first deflection range and generates first martensite deflection forces and first austenite extension forces of different magnitudes, which result in a first resultant force causing said first drive shaft to reciprocate.

2. A SMA-CDS engine according to claim 1, wherein said first mounting means allow each reciprocating primary CDS to deflect beyond its said zero axis within said first deflection range;
   said first heating and cooling means include pumping means for cyclically pumping hot and cold fluids into said first stack of primary CDSs; and
   driving means coupled to said first reciprocating drive shaft for driving said pumping means.

3. A SMA-CDS engine according to claim 1, wherein said SMA means include a second stack of secondary conical-disc-springs (CDSs), each secondary CDS having a zero axis, a martensite mode, and an austenite mode;
   a second tube;
   a second mounting means for supporting said second stack of secondary CDSs on said second tube so as to allow each secondary CDS to reciprocate along an outer wall of said second tube and to deflect beyond its said zero axis within a second predetermined deflection range;
   a second drive shaft;
   second coupling means for coupling said second shaft to said second stack of secondary CDSs;
   a second heating and cooling means for cyclically heating and cooling said second stack of secondary CDSs, thereby causing each secondary CDS to undergo a corresponding transformation cycle during each heating and cooling cycle, so that in response to said heating each secondary CDS transforms from its said martensite mode into its said austenite mode, and in response to said cooling each secondary CDS returns to its said martensite mode, and during each transformation cycle, each secondary CDS deflects within said second deflection range and generates second martensite deflection forces and second austenite extension forces of different magnitudes, which result in a second resultant force causing said second drive shaft to reciprocate;
   third coupling means for coupling said first drive shaft to said second drive shaft so as to cause said second drive shaft to reciprocate in an opposite phase relative to the phase of said reciprocating first drive shaft;
   a rotatable member; and
   motion converting means for converting said reciprocating motions of said first and of said second drive shafts into rotational motion of said rotatable member.

4. A SMA-CDS engine according to claim 1, wherein said primary CDSs are grouped in pairs back-to-back; and said secondary CDSs are grouped in pairs back-to-back.

5. A SMA-CDS engine, comprising:

a housing;

shape-memory-alloy (SMA) means including a first stack of primary conical-disc-springs (CDSs), each primary CDS having a zero axis, a martensite mode, an austenite mode, and an austenite transformation temperature range from about $-65°$ C. to $0°$ C. and from about $100°$ C. to $260°$ C.;

a first tube mounted in said housing;

first mounting means for supporting said first stack of primary CDSs on said first tube so as to allow each primary CDS to reciprocate along an outer wall of said first tube and to deflect beyond its said zero axis within a first predetermined deflection range;

a first drive shaft;

first coupling means for coupling said first drive shaft to said first stack of primary CDSs;

a first heating and cooling means for cyclically heating and cooling said first stack of primary CDSs thereby causing said first stack of primary CDSs to undergo a corresponding transformation cycle so that, in response to said heating each primary CDS transforms from its said martensite mode into its said austenite mode, and in response to said cooling each primary CDS returns to its said martensite mode, and during each transformation cycle, each primary CDS deflects within said first deflection range and generates first martensite deflection forces and first austenite extension forces of different magnitudes, which result in a first resultant force causing said first drive shaft to reciprocate;

a second stack of secondary conical-disc-springs (CDSs), each secondary CDS having a zero axis, a martensite mode, and an austenite mode;

a second tube;

second mounting means for supporting said second stack of secondary CDSs on said second tube so as to allow each secondary CDS to reciprocate along an outer wall of said second tube and to deflect beyond its said zero axis within a second predetermined deflection range;

a second drive shaft;

second coupling means for coupling said second shaft to said second stack of secondary CDSs;

a second heating and cooling means for cyclically heating and cooling said second stack of secondary CDSs thereby causing said second stack to undergo a corresponding transformation cycle so that, in response to said heating, each secondary CDS transforms from its said martensite mode into its said austenite mode, and in response to said cooling each secondary CDS returns to its said martensite mode, and during each transformation cycle, each secondary CDS deflects within said second deflection range and generates second martensite deflection forces and second austenite extension forces of different magnitudes, which result in a second resultant force causing said second drive shaft to reciprocate;

third coupling means for coupling said first drive shaft to said second drive shaft so as to cause said second drive shaft to reciprocate in an opposite phase relative to the phase of said reciprocating first drive shaft, while one of said stacks of CDSs becomes austentic and the other of said stacks of CDSs becomes martensitic;

a rotatable member; and motion converting means for converting said reciprocating motions of said first and of said second drive shafts into rotational motion of said rotatable member which results in an output torque for said engine.

6. A SMA-CDS engine, comprising:

a main housing;

shape-memory-alloy (SMA) means including a first stack of primary conical-disc-springs (CDSs), each primary CDS having a zero axis, a martensite mode, and an austenite mode;

a first perforated tube mounted in said main housing for supporting said first stack of CDSs;

fluid supply means for supplying fluids to said first stack of primary CDSs;

inner and outer spacers for separating each consecutive pair of said primary CDSs on said first tube and for allowing each primary CDS to reciprocate along an outer wall of said first tube and to deflect beyond its said zero axis, said each inner spacer and said each outer spacer having holes, and said holes, when in alignment with said perforations of said first tube, allowing said fluids to flow from said first tube through its said perforations and through said holes;

a first drive shaft in said main housing;

first coupling means for coupling said first drive shaft to said first stack of primary CDSs;

a first heating and cooling means for cyclically heating and cooling said first stack of primary CDSs thereby causing said first stack to undergo a corresponding transformation cycle so that, in response to said heating each primary CDS transforms from said first martensite mode into said first austenite mode, and, in response to said cooling each primary CDS returns to said first martensite mode, and during said each transformation cycle, each primary CDS deflects within said first deflection range and generates first martensite deflection forces and first austenite extension forces of different magnitudes, which result in a first resultant force causing said first drive shaft to reciprocate at a linear stroke that is a function of the product $D \times N$, where D is said deflection of each primary CDS, and N is the number of said primary CDSs in said first stack; and motion converting means including a crankshaft for converting said reciprocating motion of said first drive shaft into rotational motion of said crankshaft, and said rotational motion having a velocity which is a function of the duration of said transformation cycle of each primary CDS.

7. A SMA-CDS engine according to claim 6, wherein said heating and cooling means include said fluid supply means, and said fluid supply means include pumping means for cyclically pumping pressurized hot and cold fluids into said first tube, and said hot and cold fluids flow out from said first tube through its said perforations and through said holes to spray the surfaces of each primary CDS.

8. A SMA-CDS engine according to claim 7, wherein said pumping means pump said hot and cold fluids into said first stack of primary CDSs without interrupting their said reciprocating motions.

9. A SMA-CDS engine according to claim 8, wherein each primary CDS is made of a first metal alloy;
said SMA means further include a second housing;
a second stack of secondary conical-disc-springs (CDSs) mounted within said second housing, and said secondary CDSs are made of a second metal alloy that is different from said first metal alloy;
a second drive shaft in said second housing operatively coupled to said second stack of secondary CDSs for reciprocating therewith; and
said second drive shaft reciprocating in opposite phase to the phase of said reciprocating first drive shaft thereby deflecting each primary CDS at its said martensite mode.

10. A SMA-CDS engine according to claim 8, and
a second housing;
a second stack of secondary conical-disc-springs (CDSs) within said second housing, each secondary CDS has a zero axis, a martensite mode, and an austenite mode;
a second perforated tube in said second housing;
second mounting means for supporting said second stack of secondary CDSs on said second tube so as to allow each secondary CDS to reciprocate along an outer wall of said second tube and to deflect within a second predetermined deflection range;
a second drive shaft in said second housing operatively coupled to said second stack of secondary CDSs;
a second heating and cooling means for cyclically heating and cooling said second stack of secondary CDSs thereby causing said second stack of secondary CDSs to undergo a corresponding transformation cycle so that, in response to said heating, each secondary CDS transforms from said second martensite mode into said second austenite mode, and, in response to said cooling, each secondary CDS returns to said second martensite mode, and during each transformation cycle, each secondary CDS deflects within said second deflection range and generates second martensite deflection forces and second austenite extension forces of different magnitudes, which result in a second resultant force causing said second drive shaft to reciprocate; and
third coupling means for coupling said first drive shaft to said second drive shaft so as to cause said second drive shaft to reciprocate in an opposite phase relative to the phase of said reciprocating first drive shaft.

11. A SMA-CDS engine according to claim 10, wherein
said primary CDSs are grouped in pairs back-to-back; and
said secondary CDSs are grouped in pairs back-to-back.

12. A SMA-CDS engine according to claim 11, and
a heat conductive washer sandwiched between each pair of back-to-back primary CDSs; and
a heat conductive washer sandwiched between each pair of back-to-back secondary CDSs.

13. A SMA-CDS engine according to claim 7, and
a solar-heated energy system operatively coupled to said fluid supply means for heating said cold fluids.

14. A SMA-CDS engine according to claim 7, wherein
said pumping means include at least a pair of double-acting pumps;
a flywheel coupled to said pumps;
a yoke coupled to said flywheel; and
driving means for driving said pumps, said yoke, and said flywheel so as to simultaneously pump said hot and cold fluids to said first stack of said primary CDSs and to said second stack of said secondary CDSs.

15. A SMA-CDS engine according to claim 6, wherein
said heating and cooling means include said fluid supply means, and at least a pair of single-acting valves for cyclically controlling the flow of said fluids from said fluid supply means to said first tube.

16. A SMA-CDS engine according to claim 15, wherein
each primary CDS has an austenite transformation temperature range from about 100° C. to 260° C.; and
said hot and cold fluids include gases for transferring heat to and from said first stack of primary CDSs.

17. A SMA-CDS engine according to claim 16, and
a flywheel coupled to said fluid supply means;
a yoke secured to said flywheel, said yoke linking said valves; and
each valve is driven by said flywheel so as to control said flow of said gases.

18. A SMA-CDS engine according to claim 15, wherein
each primary CDS has an austenite transformation temperature range from about −65° C. to 260° C.

* * * * *